US011236695B2

(12) United States Patent
Shen et al.

(10) Patent No.: US 11,236,695 B2
(45) Date of Patent: Feb. 1, 2022

(54) DIAGNOSTIC METHODS AND SYSTEMS

(71) Applicant: GM GLOBAL TECHNOLOGY OPERATIONS LLC, Detroit, MI (US)

(72) Inventors: Jin Shen, Northville, MI (US); Jeffrey M. Hutmacher, Fowlerville, MI (US); Patricia M. Laskowsky, Ann Arbor, MI (US); Dana J. Suttman, West Bloomfiled, MI (US); Iman Mohammadrezazadeh, Los Angeles, CA (US); Ruggero Scorcioni, Malibu, CA (US); Vincent DeSapio, Westlake Village, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 168 days.

(21) Appl. No.: 16/573,109

(22) Filed: Sep. 17, 2019

(65) Prior Publication Data

US 2021/0079864 A1 Mar. 18, 2021

(51) Int. Cl.
*F02D 41/22* (2006.01)
*F02M 57/00* (2006.01)
*G06N 5/04* (2006.01)

(52) U.S. Cl.
CPC ......... *F02D 41/221* (2013.01); *F02M 57/005* (2013.01); *G06N 5/046* (2013.01); *F02D 2041/224* (2013.01); *F02D 2041/228* (2013.01)

(58) Field of Classification Search
CPC . G06N 5/046; F02D 41/221; F02D 2041/224; F02D 2041/228

USPC .................. 701/103, 104, 106, 107; 123/479
See application file for complete search history.

(56) References Cited

U.S. PATENT DOCUMENTS

| | | | | |
|---|---|---|---|---|
| 6,088,647 A | * | 7/2000 | Hemberger | F02D 41/221 701/104 |
| 7,430,483 B2 | * | 9/2008 | Wiig | G01H 1/003 701/100 |
| 7,489,997 B2 | * | 2/2009 | Iihoshi | F02D 41/1495 701/103 |
| 10,393,056 B2 | * | 8/2019 | Pursifull | F02D 41/3854 |
| 2007/0124183 A1 | * | 5/2007 | Williams | F02D 41/1401 701/103 |
| 2012/0203447 A1 | * | 8/2012 | Kammerstetter | F02D 41/22 701/104 |
| 2015/0142295 A1 | * | 5/2015 | Leblon | F02D 41/2096 701/103 |
| 2015/0159578 A1 | * | 6/2015 | Surnilla | F02D 19/061 701/104 |
| 2015/0300287 A1 | * | 10/2015 | Ulrey | F02D 41/3845 701/103 |
| 2016/0053732 A1 | * | 2/2016 | Ikemoto | F02D 35/023 239/71 |

* cited by examiner

Primary Examiner — Erick R Solis
(74) Attorney, Agent, or Firm — Lorenz & Kopf LLP

(57) ABSTRACT

Methods and systems are provided for monitoring a fuel injector of an internal combustion engine. In one embodiment, a method includes: receiving a set of feature data, the feature data sensed from a fuel injector during a fuel injection event; processing, by a processor, the set of feature data with a decision tree model to generate a prediction of a fault status; and selectively generating, by the processor, a notification signal based on the prediction.

18 Claims, 4 Drawing Sheets

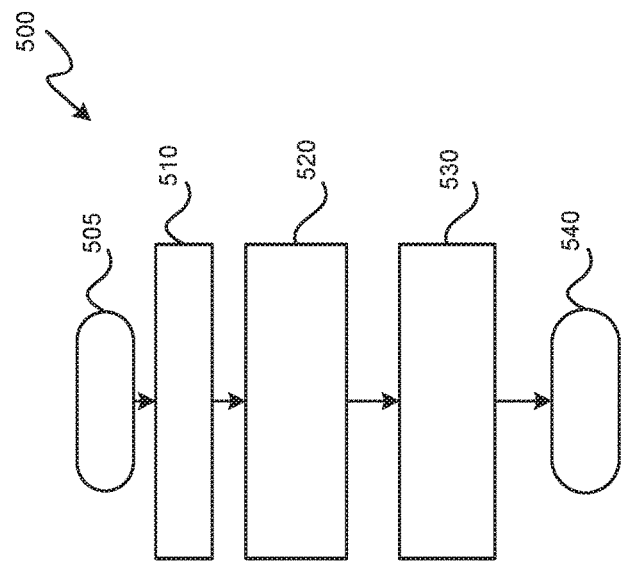
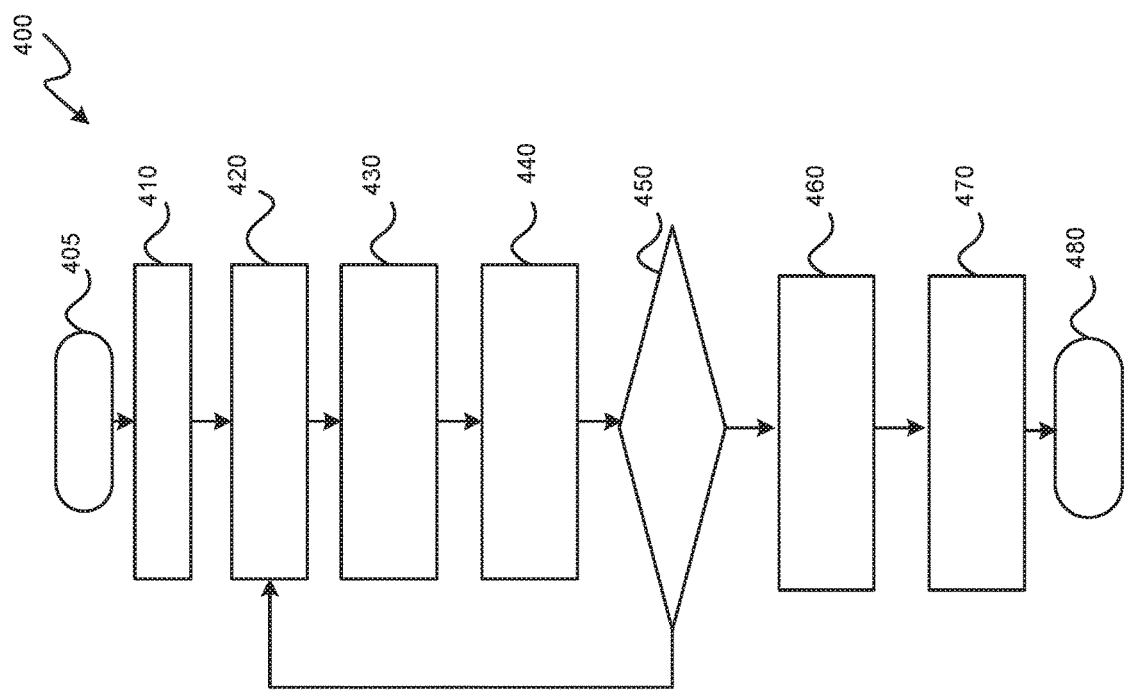

DIAGNOSTIC METHODS AND SYSTEMS

INTRODUCTION

The technical field generally relates to internal combustion engines, and more particularly relates to methods and systems for diagnosing fuel injectors of an internal combustion system.

Internal combustion engines include fuel injectors that inject fuel into an intake air stream to produce an air/fuel mixture. When a fuel injector fails, it does not deliver a desired amount of fuel or any amount of fuel into the air. Without the proper amount of fuel, the air/fuel mixture may not combust, thereby causing disruption in engine operation.

Accordingly, it is desirable to provide methods and systems for monitoring fuel injectors. Furthermore, other desirable features and characteristics of the present invention will become apparent from the subsequent detailed description and the appended claims, taken in conjunction with the accompanying drawings and the foregoing technical field and background.

SUMMARY

Methods and systems are provided for monitoring a fuel injector of an internal combustion engine. In one embodiment, a method includes: receiving a set of feature data, the feature data sensed from a fuel injector during a fuel injection event; processing, by a processor, the set of feature data with a decision tree model to generate a prediction of a fault status; and selectively generating, by the processor, a notification signal based on the prediction.

In various embodiments, the method includes: receiving training data associated with the fuel injector; and defining, by the processor, the decision tree model based on the training data.

In various embodiments, the method includes: computing gain data for a feature of the feature data based on the training data; and determining a rule to be associated with a node of the decision tree model based on the gain data.

In various embodiments, the determining the rule is based on a maximum gain value of the gain data. In various embodiments, the gain data is based on a computed entropy. In various embodiments, the computed entropy is based on a decrease in entropy after the training data is split for the feature.

In various embodiments, the training data includes data sets corresponding to a plurality of features associated with the fuel injector. In various embodiments, the plurality of features includes a first closing time, a first opening magnitude, a first opening magnitude location, a second opening magnitude, a second opening magnitude delta, a location inside a window where the second opening magnitude was detected, and a raw voltage at an early point in the window.

In various embodiments, the set of feature data comprises a first closing time, a first opening magnitude, a first opening magnitude location, a second opening magnitude, a second opening magnitude delta, a location inside a window where the second opening magnitude was detected, and a raw voltage at an early point in the window.

In another embodiment, a system includes: at least one sensor that generates sensor data based on observable conditions of the fuel injector; and a controller configured to, by a processor, receive the sensor data, process the sensor data with a decision tree model to generate a prediction of a fault status, and selectively generate a notification signal based on the prediction.

In various embodiments, the controller is further configured to: receive training data associated with the fuel injector; and define the decision tree model based on the training data.

In various embodiments, the controller is further configured to: compute gain data for a feature of the feature data based on the training data; and determine a rule to be associated with a node of the decision tree model based on the gain data.

In various embodiments, the controller determines the rule based on a maximum gain value of the gain data. In various embodiments, the gain data is based on a computed entropy.

In various embodiments, the computed entropy is based on a decrease in entropy after the training data is split for the feature.

In various embodiments, the training data includes data sets corresponding to a plurality of features associated with the fuel injector.

In various embodiments, the plurality of features includes a first closing time, a first opening magnitude, a first opening magnitude location, a second opening magnitude, a second opening magnitude delta, a location inside a window where the second opening magnitude was detected, and a raw voltage at an early point in the window.

In various embodiments, the set of feature data comprises a first closing time, a first opening magnitude, a first opening magnitude location, a second opening magnitude, a second opening magnitude delta, a location inside a window where the second opening magnitude was detected, and a raw voltage at an early point in the window.

In various embodiments, the method includes: evaluating the training data based on a histogram and a cumulative density function; and storing a parameter table of the decision tree model based on the evaluating.

In various embodiments, the controller is further configured to evaluate the training data based on a histogram and a cumulative density function, and store a parameter table of the decision tree model based on the evaluating.

BRIEF DESCRIPTION OF THE DRAWINGS

The exemplary embodiments will hereinafter be described in conjunction with the following drawing figures, wherein like numerals denote like elements, and wherein:

FIGS. 4 and 5 are flowcharts illustrating methods performed by the fuel injector monitoring system in accordance with various embodiments.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
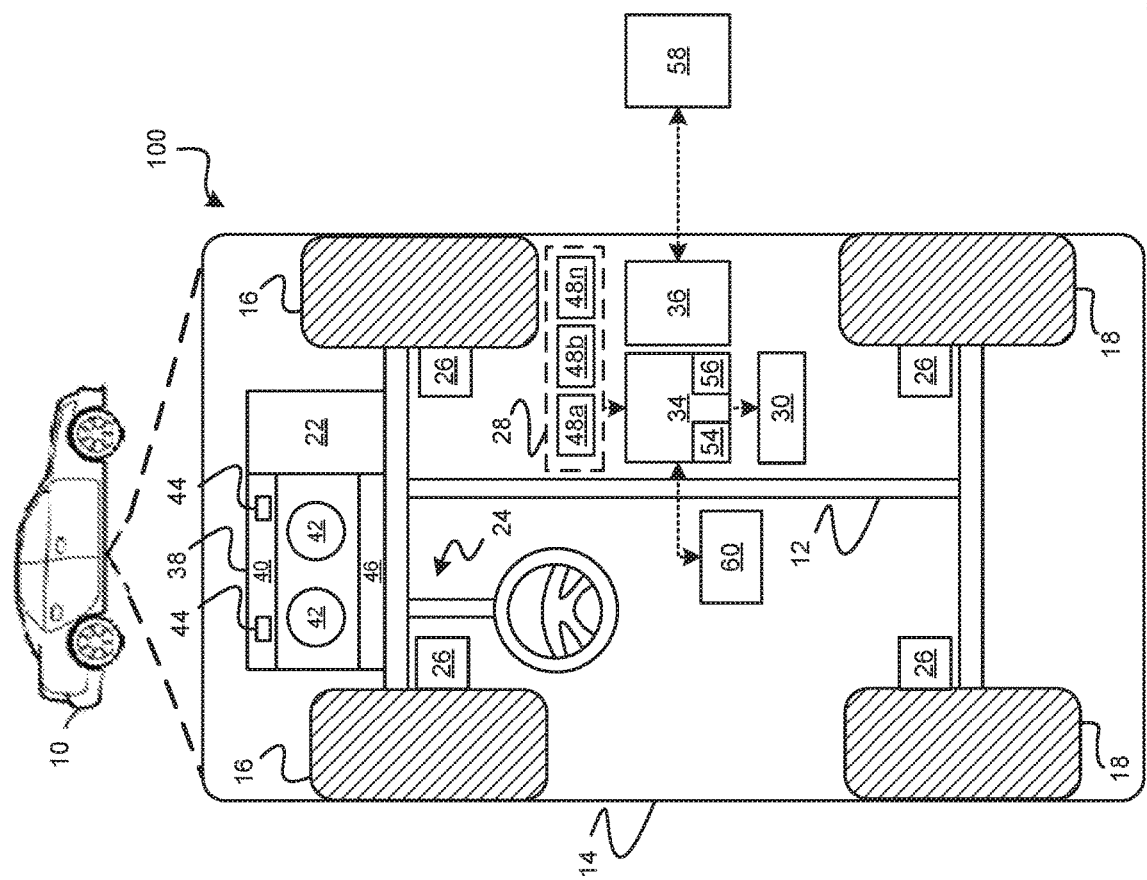
FIG. 1 is a functional block diagram illustrating a vehicle having a fuel injector monitoring system in accordance with various embodiments.

With reference to FIG. 1, a fuel injector monitoring system shown generally at 100 is associated with a vehicle 10 in accordance with various embodiments. In general, the fuel injector monitoring system 100 monitors fuel injectors of an internal combustion engine for faults. As will be discussed in more detail below, the fuel injector monitoring system 100 monitors the fuel injectors based on decision tree methods.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 is an autonomous, a semi-autonomous, or non-autonomous vehicle. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used.

As shown, the vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine 38.

The engine 38 combusts an air/fuel mixture to produce drive torque for the vehicle 10. For example, air is drawn into the engine 38 through an intake system 40. The intake system 40 includes an intake manifold and a throttle valve. Air from the intake manifold is drawn into cylinders 42 of the engine 38. While the engine 38 may include multiple cylinders 42, for illustration purposes two representative cylinders 42 are shown. For example, the engine 38 may include 2, 3, 4, 5, 6, 8, 10, and/or 12 cylinders.

In various embodiments, the engine 38 may operate using a four-stroke cycle including an intake stroke, a compression stroke, a combustion stroke, and an exhaust stroke. During the intake stroke, air from the intake manifold is drawn into the cylinders 42 through an intake valve. Fuel injectors 44 are controlled to inject fuel into the air to achieve a target air/fuel ratio. Fuel may be injected into the intake manifold at a central location or at multiple locations, such as near the intake valve of each of the cylinders 42. In various implementations, fuel may be injected directly into the cylinders 42 or into mixing chambers associated with the cylinders.

The injected fuel mixes with air and creates an air/fuel mixture in each cylinder 42. During the compression stroke, a piston (not shown) within the cylinder 42 compresses the air/fuel mixture. In various embodiments, the engine 38 may be a compression-ignition engine, in which case compression in the cylinder 42 ignites the air/fuel mixture. Alternatively, the engine 38 may be a spark-ignition engine, in which case a spark plug is energized to generate a spark in the cylinder 42, which ignites the air/fuel mixture. The timing of the spark may be specified relative to the time when the piston is at its topmost position, referred to as top dead center (TDC).

During the combustion stroke, combustion of the air/fuel mixture drives the piston down, thereby driving a crankshaft. The combustion stroke may be defined as the time between the piston reaching TDC and the time at which the piston returns to bottom dead center (BDC). During the exhaust stroke, the piston begins moving up from BDC and expels the byproducts of combustion through an exhaust valve. The byproducts of combustion are exhausted from the vehicle via an exhaust system 46.

The transmission system 22 is configured to transmit the power from the propulsion system 20 to the vehicle wheels 16-18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16-18. The brake system 26 may, in various embodiments, include friction brakes, brake by wire, a regenerative braking system such as an electric machine, and/or other appropriate braking systems. The steering system 24 influences a position of the of the vehicle wheels 16-18.

The sensor system 28 includes one or more sensing devices 48a-48n that sense observable conditions of the vehicle 10. The sensing devices 48a-48n can include, but are not limited to, fuel injector sensors that sense observable conditions associated with the fuel injectors 44.

The controller 34 includes at least one processor 54 and a computer readable storage device or media 56. The processor 54 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 56 may include volatile and nonvolatile storage in read-only memory (ROM), random-access memory (RAM), and keep-alive memory (KAM), for example. KAM is a persistent or non-volatile memory that may be used to store various operating variables while the processor 54 is powered down. The computer-readable storage device or media 56 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which comprises an ordered listing of executable instructions for implementing logical functions. The instructions, when executed by the processor 54, receive and process signals from the sensor system 28, perform logic, calculations, methods and/or algorithms for controlling the components of the vehicle 10 through the actuator system 30. Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the vehicle 10.

In various embodiments, one or more instructions of the controller 34 are embodied in the fuel injector monitoring system 100 and, when executed by the processor 54, monitor sensed values associated with the fuel injectors 44 to determine faults of the fuel injectors 44. For example, when a fuel injector fails, the fuel injector is incapable of delivering the desired amount of fuel or any fuel at all. Sensed values from the sensor system 28 are monitored based on a decision tree model to determine when a fault occurs. The controller 34 communicates the faults to a notification system 60 of the vehicle 10. The notification system 60 generates notification signals to notify a user of the vehicle 10. As can be appreciated, the notification signal can activate a visual notification system, an audio notification, and/or a haptic notification system.

In various embodiments, the sensed values include voltage data associated with each fuel injector 44. The sensed values are processed into feature data for each injection event. The feature data includes, but is not limited to, an opening period (OT), an opening magnitude (OM), an opening magnitude location (OML), a closing period (CT), and a raw voltage (V). The opening period of the fuel injector 44 may refer to the period between a first time when power is applied to the fuel injector 44 to open the fuel injector 44 and a second time when the fuel injector 44 actually becomes open and begins injecting fuel. The opening magnitude of the fuel injector 44 may correspond to how much the fuel injector 44 opens for a fuel injection event. The closing period of the fuel injector 44 may refer to the period between a first time when power is removed from the fuel injector 44 to close the fuel injector 44 and a second time when the fuel injector 44 actually becomes closed and stops injecting fuel.

The faults can be determined by evaluating the feature data with one or more decision tree models. Different fuel injectors, however, may have different closing periods, opening periods, opening magnitudes, and other characteristics. Thus, the machine learning models can be tuned for each fuel injector type. In various embodiments, the tuning can be performed by a remote system 58 (e.g., offline) and communicated to the controller 34 via the communication system 36 and/or can be performed by the controller 34 (e.g., online).

Figure 2:
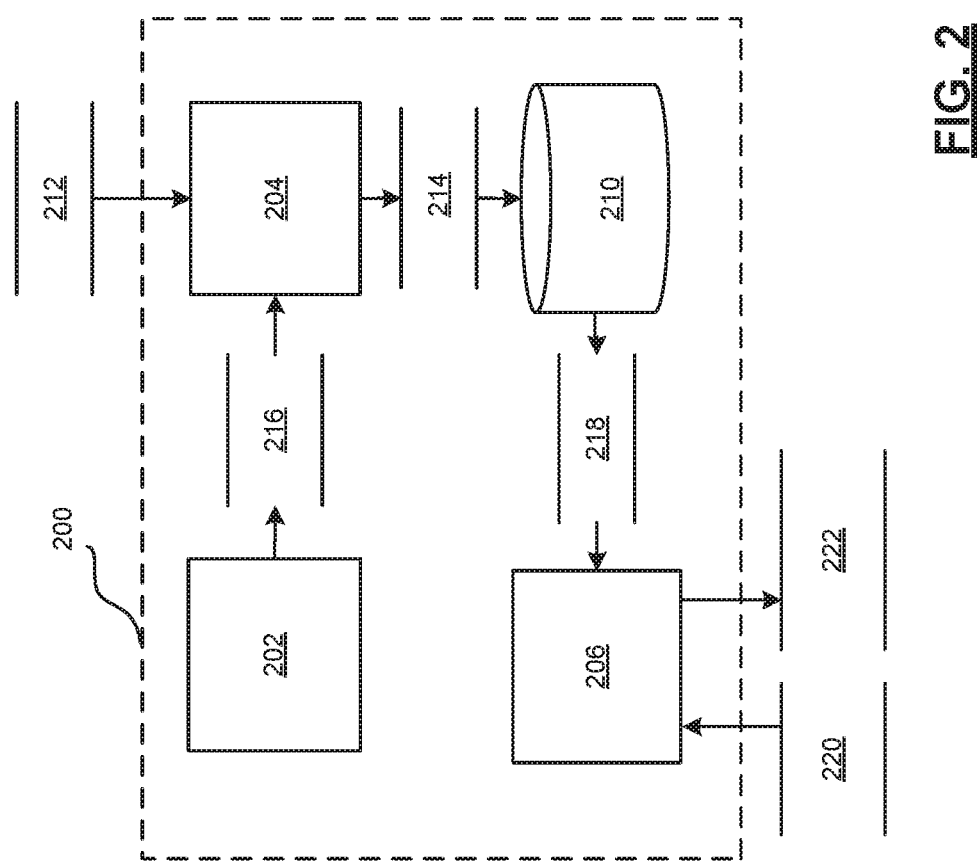
FIG. 2 is a dataflow diagram illustrating a fuel injector monitoring system in accordance with various embodiments.

Referring now to FIG. 2, and with continued reference to FIG. 1, a dataflow diagram illustrates various embodiments of a decision tree system 200 which may be embedded within the controller 34 and which may include parts of the fuel injector monitoring system 100 in accordance with various embodiments. Various embodiments of the decision tree system 200 according to the present disclosure can include any number of sub-modules embedded within the controller 34. As can be appreciated, the sub-modules shown in FIG. 2 can be combined and/or further partitioned to similarly monitor the fuel injectors 44 for faults. Inputs to decision tree system 200 may be received from the sensor system 28, received from other controllers (not shown) associated with the vehicle 10, received from the communication system 36, and/or determined/modeled by other sub-modules (not shown) within the controller 34. In various embodiments, the decision tree system 200 includes a gain computation module 202, a tree definition module 204, a monitoring module 206, and a model datastore 210.

Figure 3:
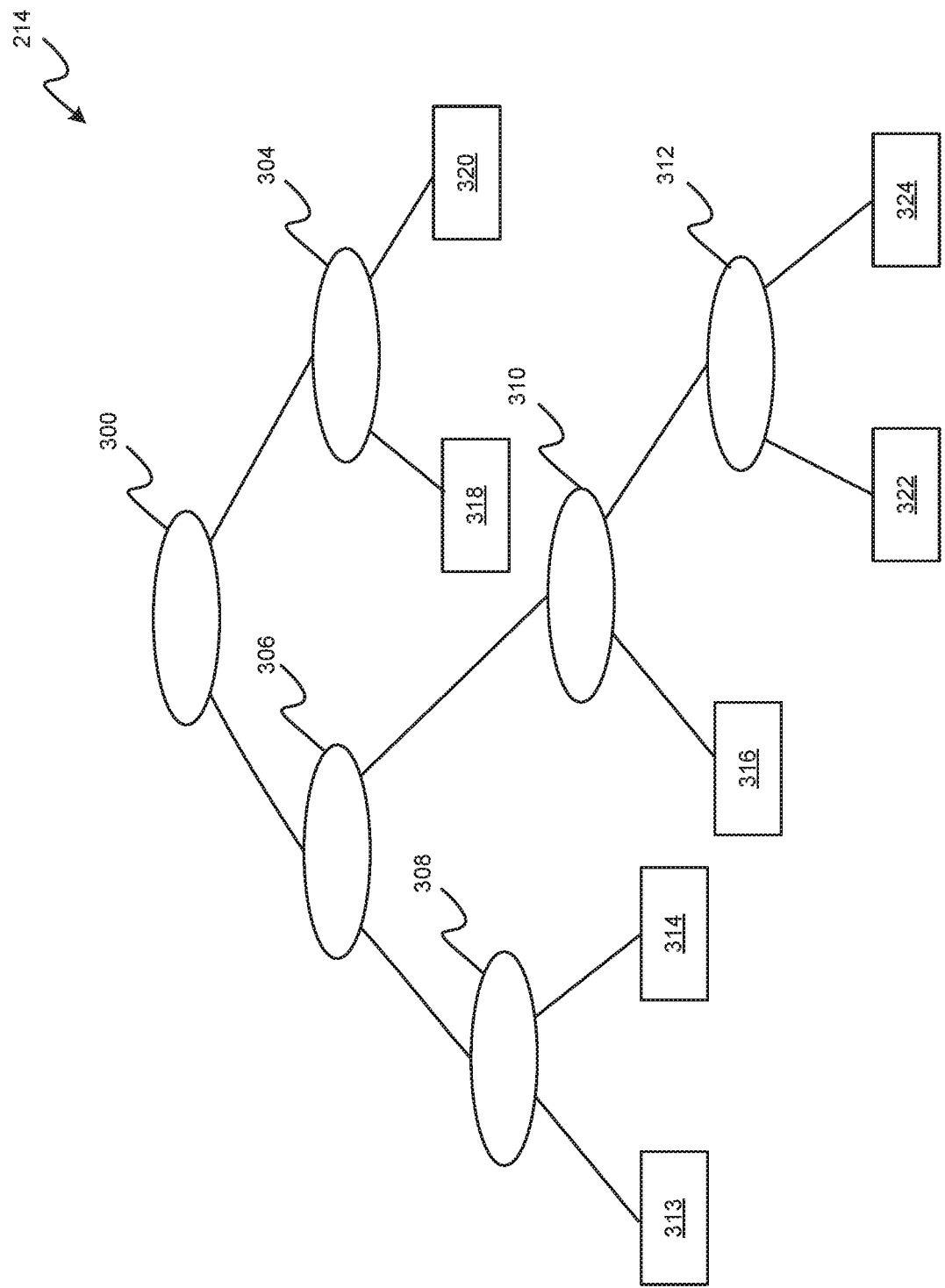
FIG. 3 is a functional block diagram illustrating a decision tree of the fuel injector monitoring system in accordance with various embodiments.

In various embodiments, the tree definition module 204 receives as input training data 212 and defines a decision tree model 214 based thereon. The decision tree model 214 includes rules implemented in a tree-like structure to predict pass or fail data. In various embodiments, as shown in FIG. 3, the tree-like structure includes, an initial node 300, two or more sub-nodes 304-310, and two or more leaf or end nodes 312-324. Each node 300-324 has an associated rule. The initial node 300 and the sub-nodes 304-310 include comparison rules (e.g., $OM1<=206.32$ at 300, $OM1L<=23$ at 306, $Evolt <=-7.8267$ at 304, $OM1<=121.55$ at 308, $OM1<=194.03$ at 310, $Evolt<=-8.6367$ at 312) and the leaf nodes 313-324 include pass or fail rules (e.g., FAIL 313, PASS 314, FAIL 316, PASS 318, FAIL 320, PASS 322, FAIL 324).

With reference back to FIG. 2, in various embodiments, the tree definition module 204 generates the decision tree model 214 based on training data 212 associated with the fuel injector 44 monitoring. For example, the training data 212 can include data for each feature of a feature set used to diagnose a missing pulse of the fuel injector 44. The features of the feature set can include, but are not limited to, a first closing time (CT1), a first opening magnitude (OM1), a first opening magnitude location (OM1L), a second opening magnitude (OM2), a second opening magnitude delta (OM2Delta), a location inside window where the second opening magnitude was detected (OM2Location), and a raw voltage at an early point in the window (Evolt). The data can include previously sensed values for each feature.

The tree definition module 204 defines the decision tree model 214 by breaking down each data set for each feature into smaller and smaller subsets by rules at each node. Each rule is a decision process to compare a feature of the feature set to a threshold. The final result or end node is a pass or fail decision. As will be discussed in more detail below, the tree definition module 204 breaks down each feature based on gain data 216. The tree definition module 204 then stores the defined decision tree model 214 in the model datastore 210 for processing future feature set data.

In various embodiments, the decision tree model includes a parameter table and an associated algorithm. The values stored in the parameter table are implemented by the algorithm thus, allowing the algorithm to be tunable for each fuel injector 44. In various embodiments, the algorithm can be implemented according to any decision tree method such as, but not limited to, ID3, C4.0, C5.0, or other version that utilizes the gain data 216.

In various embodiments, the parameter table stores a list of rules, outcomes, and confidence values associated with the rules. In various embodiments, the confidence value for each rule is computed as the ratio of the number of training cases in the training data 212 that are correctly classified by the rule divided by the total training cases covered by the rule.

In various embodiments, the size of the parameter table can be defined based on an evaluation of the training data 212 using a histogram and a cumulative density function. For example, a number of rows can be determined by computing a histogram and a cumulative density function from the number of rules of the observations in the training data 212. Similarly, a number of columns can be determined by computing the histogram and cumulative density function from the number of conditions needed to evaluate a rule. Since each rule has an outcome class of 0 or 1, the total number of cells in the column of the parameter table is set to maximum number of conditions multiplied by three plus two. Thus, the total number of cells in the parameter table is set equal to the total number of rows by the total number of columns.

The gain determination module 202 computes the gain data 216 used by the tree definition module 204. In various embodiments, the gain determination module 216 computes the gain data based on a computed entropy after a data set is divided for a feature. The entropy is the measure of impurity, disorder, or uncertainty in the set of examples.

$$\text{Entropy} = -\Sigma_{i=1}^{n} P(x_i) \log(P(x_i)).$$

Where $P(x_i)$ is a fraction of points in a given class (e.g., pass or fail).

For example, given the feature OM1 discussed above and the example threshold 206.32, the entropy is computed as:

$$\text{Entropy} = P(OM1 \le 206.32)\{-P(\text{pass}) \log(P(\text{pass})) - P(\text{fail}) \log(P(\text{fail}))\} +$$
$$P(OM1 < 206.32)$$
$$\{-P(\text{pass}) \log(P(\text{pass})) - P(\text{fail}) \log(P(\text{fail}))\},$$

$$P(OM1) \le 206.32) = \frac{pts \text{ where } OMA \le 206.32}{\text{total } num \text{ of } pts},$$

$$P(\text{pass}) = \frac{pts \text{ with pass label}}{\text{total } num \text{ of } pts}, \text{ and}$$

$$P(OM1) > 206.32) = \frac{pts \text{ where } OMA > 206.32}{\text{total } num \text{ of } pts},$$

$$P(\text{fail}) = \frac{pts \text{ with fail label}}{\text{total } num \text{ of } pts}.$$

The gain data 216 is set to the computed entropy. The gain data 216 is then provided to the tree definition module 204.

The monitoring module 204 receives as input sensed feature set data 220 including data used to diagnose a missing pulse of the fuel injector 44. The feature set data 220 can include, but is not limited to, a first closing time (CT1), a first opening magnitude (OM1), a first opening magnitude location (OM1L), a second opening magnitude (OM2), a second opening magnitude delta (OM2Delta), a location inside window where the second opening magnitude was detected (OM2Location), and a raw voltage at an early point in the window (Evolt). As can be appreciated, the feature set data 220 can include other data in various embodiments and is not limited to the present examples.

The monitoring module 206 retrieves model data 218 including a decision tree model from the model datastore 210 and processes the feature set data 220 with the decision tree model to predict a fault and provide fault prediction data 222. The fault prediction data 222 may be used by the notification system to notify a user of a fault.

Referring now to FIGS. 4 and 5, and with continued reference to FIGS. 1-3, flowcharts illustrate methods 400, 500 that can be performed by the fuel injector monitoring system 100 of FIG. 1 in accordance with the present disclosure. As can be appreciated, in light of the disclosure, the order of operation within the method is not limited to the sequential execution as illustrated in FIGS. 4 and 5 but may be performed in one or more varying orders as applicable and in accordance with the present disclosure.

In various embodiments, the method 400 can be scheduled to run based on one or more predetermined events. For example, the method 400 may begin at 405. The training data 212 is received at 410. A feature is selected from the feature set at 420. The gain data 216 is computed at 430, for example, as discussed above. The gain data 216 and the associated data is evaluated at 440 to construct the branches. A node and two branches are defined based on a maximum gain of the gain data 216.

For example, if the current selected feature is OM1 and the corresponding data set includes OM1 values: 196.47, 180.73, 206.32, 201.17, 222.08, the tree definition module 204 considers the following possibilities:

OM1 <=196.47 & OM1>196.47,
OM1 <=180.73 & OM1 >180.73,
OM1 <=206.32 & OM1 >206.32,
OM1 <=201.17 & OM1 >201.17, and
OM1 <=222.08 & OM1 >222.08.

The computed gain data is associated with each possibility the possibility with the maximum gain is selected as the threshold value for splitting the branches.

Thereafter, a next feature is selected at 420 and the steps 430 and 440 are repeated until the features of the feature set have been processed at 450. Thereafter, the nodes are defined based on the feature/threshold pair that has the maximum information at 460. The decision tree model is then stored at 470 and the method may end at 480.

In various embodiments, the method 500 can be scheduled to run based on one or more predetermined events, and/or can run continuously during operation of the vehicle 10. For example, the method 500 may begin at 505. The feature set data 220 is received at 510. The feature set data 220 is processed with the model retrieved from the model datastore 210 at 520 to obtain a prediction. Thereafter, the notifications are sent based on the prediction at 530 and the method 500 may end at 540.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method of monitoring a fuel injector during operation of an internal combustion engine, comprising:
receiving a set of feature data, the feature data sensed from a fuel injector during a fuel injection event, wherein the set of feature data includes a first closing time, a first opening magnitude, a first opening magnitude location, a second opening magnitude, a second opening magnitude delta, a location inside a window where the second opening magnitude was detected, and a raw voltage at an early point in the window;
processing, by a processor, the set of feature data with a decision tree model to generate a prediction of a fault status, wherein the decision tree model includes an initial node, two or more sub-nodes, and two or more leaf or end nodes, wherein each node has an associated rule that compares feature data to a threshold; and
selectively generating, by the processor, a notification signal that activates a notification device based on the prediction.

2. The method of claim 1, further comprising:
receiving training data associated with the fuel injector; and
defining, by the processor, the thresholds of the decision tree model based on the training data.

3. The method of claim 2, further comprising:
computing gain data for a feature of the feature data based on the training data; and
determining a rule to be associated with a node of the decision tree model based on the gain data.

4. The method of claim 3, wherein the determining the rule is based on a maximum gain value of the gain data.

5. The method of claim 3, wherein the gain data is based on a computed entropy.

6. The method of claim 5, wherein the computed entropy is based on a decrease in entropy after the training data is split for the feature.

7. The method of claim 2, wherein the training data includes data sets corresponding to a plurality of features associated with the fuel injector.

8. The method of claim 7, wherein the plurality of features includes a first closing time, a first opening magnitude, a first opening magnitude location, a second opening magnitude, a second opening magnitude delta, a location inside a window where the second opening magnitude was detected, and a raw voltage at an early point in the window.

9. A system for monitoring a fuel injector of an internal combustion engine, comprising:
at least one sensor that generates sensor data based on observable conditions of the fuel injector, wherein the sensor data comprises a first closing time, a first opening magnitude, a first opening magnitude location, a second opening magnitude, a second opening magnitude delta, a location inside a window where the second opening magnitude was detected, and a raw voltage at an early point in the window; and
a controller configured to, by a processor, receive the sensor data, process the sensor data with a decision tree model to generate a prediction of a fault status, and selectively generate a notification signal to activate a notification device based on the prediction, wherein the decision tree model includes an initial node, two or more sub-nodes, and two or more leaf or end nodes, wherein each node has an associated rule that compares sensor data to a threshold.

10. The system of claim 9, wherein the controller is further configured to:
receive training data associated with the fuel injector; and
define the thresholds of the decision tree model based on the training data.

11. The system of claim 10, wherein the controller is further configured to:
compute gain data for a feature of the feature data based on the training data; and
determine a rule to be associated with a node of the decision tree model based on the gain data.

12. The system of claim 11, wherein the controller determines the rule based on a maximum gain value of the gain data.

13. The system of claim 11, wherein the gain data is based on a computed entropy.

14. The system of claim 13, wherein the computed entropy is based on a decrease in entropy after the training data is split for the feature.

15. The system of claim 11, wherein the training data includes data sets corresponding to a plurality of features associated with the fuel injector.

16. The system of claim 15, wherein the plurality of features includes a first closing time, a first opening magnitude, a first opening magnitude location, a second opening magnitude, a second opening magnitude delta, a location inside a window where the second opening magnitude was detected, and a raw voltage at an early point in the window.

17. The method of claim 2, further comprising:
evaluating the training data based on a histogram and a cumulative density function; and
storing a parameter table of the decision tree model based on the evaluating.

18. The system of claim 10, wherein the controller is further configured to evaluate the training data based on a histogram and a cumulative density function and store a parameter table of the decision tree model based on the evaluating.

* * * * *